United States Patent
Liu et al.

(10) Patent No.: US 11,595,615 B2
(45) Date of Patent: Feb. 28, 2023

(54) CONFERENCE DEVICE, METHOD OF CONTROLLING CONFERENCE DEVICE, AND COMPUTER STORAGE MEDIUM

(71) Applicants: K-Tronics (Suzhou) Technology Co., Ltd., Jiangsu (CN); BOE Technology Group Co., Ltd., Beijing (CN)

(72) Inventors: Kangjian Liu, Beijing (CN); Jingyuan Yu, Beijing (CN); Laishou Cai, Beijing (CN); Jie Wang, Beijing (CN); Cheng Yang, Beijing (CN)

(73) Assignees: K-TRONICS (SUZHOU) TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 449 days.

(21) Appl. No.: 16/914,681

(22) Filed: Jun. 29, 2020

(65) Prior Publication Data
US 2021/0014456 A1 Jan. 14, 2021

(30) Foreign Application Priority Data
Jul. 9, 2019 (CN) .......................... 201910613427.1

(51) Int. Cl.
*H04N 7/15* (2006.01)
*G03H 1/04* (2006.01)
(Continued)

(52) U.S. Cl.
CPC .............. *H04N 7/157* (2013.01); *G03H 1/04* (2013.01); *G03H 1/22* (2013.01); *G06F 3/011* (2013.01);
(Continued)

(58) Field of Classification Search
CPC .... H04N 7/157; H04N 7/0142; H04N 7/0147; H04N 7/152; H04N 7/142; H04N 7/147;
(Continued)

(56) References Cited

U.S. PATENT DOCUMENTS

| 8,508,576 | B2 | 8/2013 | Liu et al. | |
| 9,661,272 | B1* | 5/2017 | Daniel | G03H 1/0005 |
| 9,661,273 | B2 | 5/2017 | Wu | |
| 2009/0119604 | A1* | 5/2009 | Simard | G06Q 10/10 715/757 |

(Continued)

FOREIGN PATENT DOCUMENTS

| CN | 101534413 A | 9/2009 |
| CN | 103634563 A | 3/2014 |

(Continued)

OTHER PUBLICATIONS

First Office Action, including Search Report, for Chinese Patent Application No. 201910613427.1, dated Sep. 9, 2022, 21 pages.

*Primary Examiner* — Amit Chatly
(74) *Attorney, Agent, or Firm* — Westman, Champlin & Koehler, P.A.

(57) ABSTRACT

The present disclosure provides a conference device, a method of controlling the conference device, and a computer storage medium. The conference device includes a display, an image sensor, a holographic projector, and a controller configured to identify, by using an image data from the image sensor, a modification action performed at a target location for a holographic image projected by the holographic projector, modify holographic projection data based on the modification action, and convert modified holographic projection data into modified two-dimensional imaging data.

14 Claims, 6 Drawing Sheets

(51) Int. Cl.
  *G03H 1/22* (2006.01)
  *G06F 3/14* (2006.01)
  *G06F 3/01* (2006.01)
  *G06F 3/048* (2013.01)
  *H04N 7/01* (2006.01)
  *G03H 1/00* (2006.01)

(52) U.S. Cl.
  CPC ............ G06F 3/048 (2013.01); G06F 3/14 (2013.01); H04N 7/0142 (2013.01); H04N 7/0147 (2013.01); H04N 7/152 (2013.01); *G03H 1/0005* (2013.01); *G03H 2001/0088* (2013.01)

(58) Field of Classification Search
  CPC ............ H04N 7/15; H04N 7/181; G03H 1/04; G03H 1/22; G03H 1/0005; G03H 2001/0088; G03H 2001/2284; G03H 2226/02; G03H 2226/04; G03H 2226/05; G06F 3/011; G06F 3/048; G06F 3/14; G06F 3/1454; H04L 12/1827
  See application file for complete search history.

(56) References Cited

U.S. PATENT DOCUMENTS

| | | | |
|---|---|---|---|
| 2011/0193935 A1* | 8/2011 | Gorzynski | H04N 7/142 348/E7.083 |
| 2012/0033030 A1 | 2/2012 | Liu et al. | |
| 2014/0362161 A1* | 12/2014 | Leete, III | H04W 4/00 348/14.02 |
| 2015/0208036 A1 | 7/2015 | Wu | |
| 2019/0025589 A1* | 1/2019 | Haddick | G06F 3/013 |
| 2019/0080097 A1* | 3/2019 | Hardee | G06F 21/6245 |
| 2019/0196404 A1* | 6/2019 | Bostick | G03H 1/0005 |
| 2020/0363636 A1* | 11/2020 | Karafin | G06F 3/016 |
| 2021/0060405 A1* | 3/2021 | Karafin | A63B 71/0622 |

FOREIGN PATENT DOCUMENTS

| | | |
|---|---|---|
| CN | 104333574 A | 2/2015 |
| CN | 105306868 A | 2/2016 |
| CN | 107948577 A | 4/2018 |
| CN | 108513117 A | 9/2018 |
| CN | 109413364 A | 3/2019 |

* cited by examiner

100

100

CONFERENCE DEVICE, METHOD OF CONTROLLING CONFERENCE DEVICE, AND COMPUTER STORAGE MEDIUM

CROSS-REFERENCE TO RELATED APPLICATION

This application claims priority to Chinese Patent Application No. 201910613427.1 filed on Jul. 9, 2019, the whole disclosure of which is incorporated herein by reference.

TECHNICAL FIELD

The present disclosure relates to the field of imaging technology, and in particular to a conference device, a method of controlling the conference device, and a computer storage medium.

BACKGROUND

Two-dimensional image display devices are widely used in teaching, office, and other places. When the two-dimensional image display device is applied to a conference system, simple two-dimensional imaging and remote interconnection and interaction of reports may be performed, and annotation discussion may be carried out on the display screen of the two-dimensional image display device.

In this way, because the remote and current scenes are only communicated through the display screen of the two-dimensional image display device, and the space range of the conference room is different, the participation and interaction of the participants are limited.

SUMMARY

This part provides some embodiments. More embodiments will be described in Detailed Description. This part is not used to limit the scope of protection of the present disclosure.

An embodiment of the present disclosure proposes a conference device, comprising: a display, configured to display a two-dimensional image; an image sensor, configured to collect image data in an environment where the conference device is located; a holographic projector, configured to generate a holographic image according to holographic projection data and project the holographic image to a target location; and a controller connected to the display, the image sensor and the holographic projector, configured to acquire the two-dimensional image displayed on the display, convert the two-dimensional image into the holographic projection data, acquire the image data provided by the image sensor, identify a modification action in the image data that is performed at the target location for the holographic image projected by the holographic projector to the target location, modify the holographic projection data based on the modification action, and convert the modified holographic projection data into modified two-dimensional imaging data, so as to control the display to update the two-dimensional image based on the modified two-dimensional imaging data.

According to an embodiment, the controller comprises a first controller and a second controller, wherein the first controller is connected to the display and the holographic projector, and is configured to acquire the two-dimensional image displayed on the display, convert the two-dimensional image into holographic projection data, acquire the modified holographic projection data, and convert the modified holographic projection data into modified two-dimensional imaging data, so as to control the display to update the two-dimensional image based on the modified two-dimensional imaging data; and wherein the second controller is connected to the image sensor and the first controller, and is configured to acquire the image data provided by the image sensor, identify the modification action in the image data that is performed at the target location for the holographic image projected by the holographic projector to the target location, and provide the modified holographic projection data to the first controller.

According to an embodiment, the conference device further comprises: an audio sensor connected to the controller, configured to collect voice data in the environment where the conference device is located; wherein the controller is further configured to determine, based on the voice data, a location of a sound source generating the voice data as the target location.

According to an embodiment, the controller is further configured to identify, by using the voice data, a modification action performed at the target location for the holographic image, and modify the holographic projection data based on the modification action.

According to an embodiment, the image sensor comprises a plurality of image sensors each provided with a wireless interface and arranged at a plurality of locations in the environment where the conference device is located.

According to an embodiment, the plurality of image sensors each are further provided with a wired interface, arranged around the display, and configured to collect the two-dimensional image displayed on the display.

According to an embodiment, the conference device further comprises: a memory for storing a management database, connected to the controller and configured to provide the controller with information about an object participating in a conference in the environment where the conference device is located, and wherein the controller is further configured to associate the information about the object with the identified modification action performed at the target location for the holographic image.

An embodiments of the present disclosure proposes a method of controlling the above-mentioned conference device, comprising: acquiring a two-dimensional image displayed, and converting the two-dimensional image into holographic projection data; acquiring image data, and identifying a modification action in the image data that is performed for holographic image at a target location where the holographic image is formed, wherein the holographic image is projected based on the holographic projection data; modifying the holographic projection data based on the modification action, and converting the modified holographic projection data into modified two-dimensional imaging data; and controlling to update the two-dimensional image based on the modified two-dimensional imaging data.

According to an embodiment, the method further comprises: determining, based on voice data acquired in the environment where the conference device is located, a location of a sound source that generates the voice data as the target location.

According to an embodiment, the method further comprises identifying, with the voice data, the modification action performed for the holographic image at the target location.

According to an embodiment, the modification action performed for the holographic image at the target location comprises rotation, movement, magnification, inversion and stretching for the holographic image.

According to an embodiment, the method further comprises: transmitting the two-dimensional image to a conference device in another environment, so as to display the two-dimensional image in another environment.

According to an embodiment, the method further comprises: receiving a two-dimensional image from a conference device in another environment, wherein the two-dimensional image from the conference device in another environment comprises a modification action performed for the holographic image in another environment.

According to an embodiment, the method further comprises: acquiring information about an object participating in a conference in the environment where the conference device is located; and associating the information about the object with the identified modification action performed for the holographic image at the target location.

A third aspect of the embodiments of the present disclosure proposes a computer storage medium, having a computer program stored thereon that, when executed, performs the above-mentioned method.

Additional aspects and advantages of the present disclosure will be given in the following description, some of which will become apparent from the following description, or will be learned from the practice of the present disclosure.

BRIEF DESCRIPTION OF THE ACCOMPANYING DRAWINGS

The above-mentioned and/or additional aspects and advantages of the present disclosure will become apparent and easy to understand from the following description of the embodiments with reference to the drawings, in which.

DETAILED DESCRIPTION

Figure 1A:
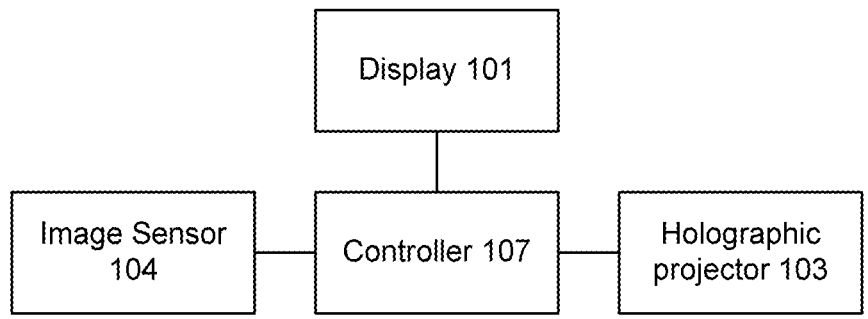
FIGS. 1A and 1B are schematic structural diagrams of a conference device according to an embodiment of the present disclosure.

The embodiments of the present disclosure are described in details below, and examples of the embodiments are shown in the drawings, in which the same or similar reference numerals indicate the same or similar elements or elements having the same or similar functions throughout. The embodiments described below with reference to the drawings are exemplary and are intended to explain the present disclosure, and should not be construed as limiting the present disclosure.

Figure 1B:
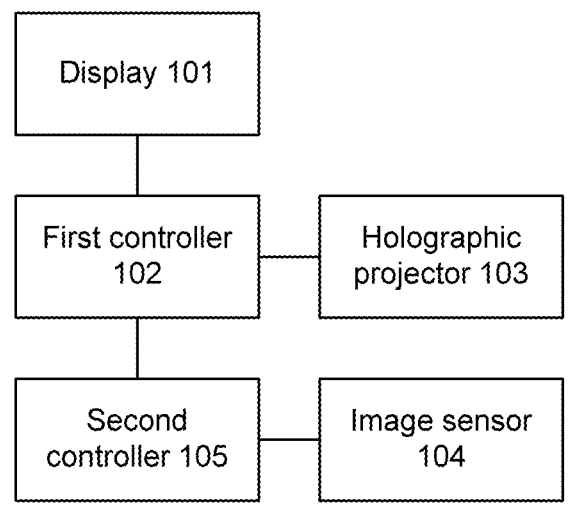

FIGS. 1A and 1B are schematic structural diagrams of a conference device according to an embodiment of the present disclosure.

As shown in FIG. 1A, a conference device 100 comprises a display 101, a holographic projector 103, an image sensor 104, and a controller 107. The controller 107 is connected to the display 101, the holographic projector 103 and the image sensor 104. The controller 107 is configured to acquire a two-dimensional image displayed on the display 101, convert the two-dimensional image into holographic projection data, acquire image data provided by the image sensor 104, identify a modification action in the image data that is performed at the target location for the holographic image projected by the holographic projector 103 to the target location, modify the holographic projection data based on the modification action, and convert the modified holographic projection data into modified two-dimensional imaging data, so as to control the display 101 to update the two-dimensional image based on the modified two-dimensional imaging data.

According to the embodiment, the controller 107 comprises a first controller and a second controller, as shown in FIG. 1B, a conference device 100 comprises a display 101, a first controller 102, a holographic projector 103, an image sensor 104, and a second controller 105.

The display 101 is configured to display a two-dimensional image. In the embodiment of the present disclosure, the display may be a display of an intelligent interactive device, such as a display of an electronic whiteboard, a display of a conference interactive tablet, a display of an educational machine, or other display or display screen having a display function in different scenarios.

In the following embodiments, an electronic whiteboard is used as an example for description. The electronic whiteboard has a writing application and may replace a non-electronic whiteboard or blackboard, so it is called an electronic whiteboard. The electronic whiteboard has components such as display and processor. The writing application of the electronic whiteboard displays the canvas after being opened. Then the user may write, draw, and input corresponding content on the canvas of the electronic whiteboard, in short, input the content on the electronic whiteboard. For example, the user may modify the display parameters of the handwriting or drawing content on the electronic whiteboard. Alternatively, the user may also modify, erase, or annotate the content displayed on the electronic whiteboard. Accordingly, the display of the electronic whiteboard may receive user input data.

The first controller 102 is connected to the display 101. The first controller 102 is configured to convert the two-dimensional image displayed on the display 101 into holographic projection data, and convert the received modified holographic projection data into modified two-dimensional imaging data. Then the display 101 may update the displayed two-dimensional image according to the modified two-dimensional imaging data.

The holographic projector 103 is connected to the first controller 102. The holographic projector 103 is configured to generate a holographic image according to the holographic projection data provided by the first controller 102, and project the generated holographic image to a target location.

The image sensor 104 is configured to collect image data in the environment where the conference device is located.

The image sensor 104 may be Charge Coupled Device (CCD), Complementary Metal Oxide Semiconductor (CMOS), Thin Film Transistor (TFT) or other image acquisition devices, which is not limited in the present disclosure.

The second controller 105 is connected to the image sensor 104 and the first controller 102. The second controller 105 acquires holographic projection data from the first controller 102 and acquires image data from the image sensor 104. The second controller 105 is configured to identify, by using the image data, a modification action performed at the target location for the holographic image, modify the holographic projection data based on the identified modification action, and provide the modified holographic projection data to the first controller 102.

It should be noted that holographic technique is a technique for recording and reproducing real three-dimensional images of objects using the principles of interference and diffraction. Holographic image technology is a next-generation display technology that projects three-dimensional stereoscopic images in three-dimensional space. Holographic projection is a type of holographic image.

According to the conference device of the embodiment of the present disclosure, the two-dimensional image displayed on the display is converted into holographic projection data based on the holographic projection technology, a holographic image is generated based on the converted holographic projection data, and the generated holographic image is projected to the target location, so that holographic imaging may be performed at different target locations. At the same time, the modification action performed at different target locations for the holographic image are acquired based on the image data in the environment acquired by the image sensor, so that other participants in the environment away from the display may also easily modify the two-dimensional image displayed on the display, which is helpful to improve the participation of participants and the timeliness of interaction.

Figure 2:
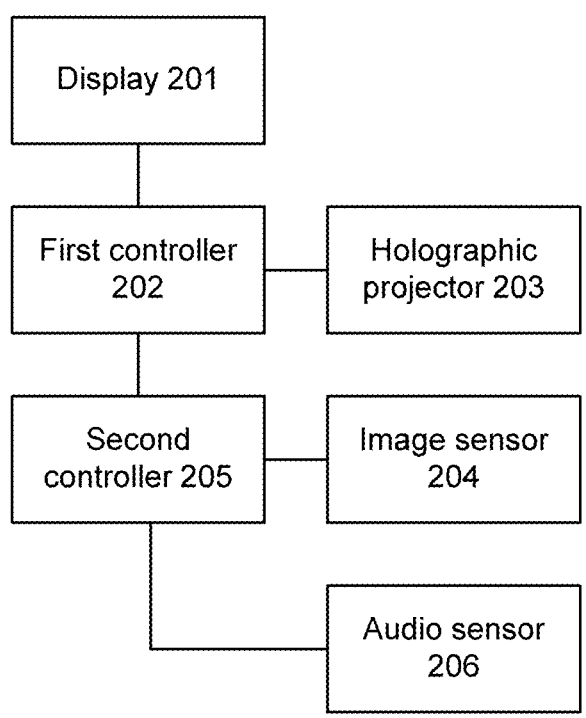
FIG. 2 is a schematic structural diagram of a conference device according to another embodiment of the present disclosure.

FIG. 2 is a schematic structural diagram of a conference device according to another embodiment of the present disclosure.

As shown in FIG. 2, a conference device 200 comprises a display 201, a first controller 202, a holographic projector 203, an image sensor 204, a second controller 205 and an audio sensor 206. The display 201, the first controller 202, the holographic projector 203 and the image sensor 204 have the same configurations as the display 101, the first controller 102, the holographic projector 103 and the image sensor 104 of the conference device 100 shown in FIG. 1B, which are not repeated here.

As shown in FIG. 2, the audio sensor 206 is connected to second controller 205 and is configured to collect voice data in the environment where the conference device is located.

The second controller 205 is further configured to determine, based on the voice data, a location of a sound source generating the voice data, and determine the location of the sound source as the target location of the holographic projection.

According to the embodiment, the second controller 205 is further configured to identify, by using the voice data, a modification action performed at the target location for the holographic image, modify the holographic projection data based on the modification action, and provide the modified holographic projection data to the first controller 202.

It may be understand that the second controller 205 may identify, based on the voice data collected by the image sensor 204, the audio data collected by the audio sensor 206 and the location of the sound source determined based on the audio data, a modification action performed at the target location for the holographic image, and modify the holographic projection data based on the modification action.

According to the conference device of the embodiment of the present disclosure, the two-dimensional image displayed on the display is converted into holographic projection data based on the holographic projection technology, a holographic image is generated based on the converted holographic projection data, a location of participant is determined based on the audio data, and by using the location of the participant as the target location, the generated holographic image is projected to the target location. In this way, other participants in the environment away from the display may also easily modify the two-dimensional image displayed on the display, which is helpful to improve the participation of participants and the timeliness of interaction, and improve the quality and efficiency of the meeting or teaching.

According to the embodiment, the image sensor 104 and the image sensor 204 may comprise a plurality of wireless image sensors arranged at a plurality of acquisition points in the environment where the conference device is located.

It may be understood that the number and installation positions of the image sensors 104 and the image sensors 204 may be determined according to the space size of the conference space in the environment where the conference device is located. For example, when the conference space is large, the number of image sensors 104 and image sensors 204 may be set relatively more in order to realize the omnidirectional collection of information such as portraits, actions, and articles of the participants in the environment. However, when the conference space is small, the number of image sensors 104 and image sensors 204 may be set relatively small.

Figure 3:
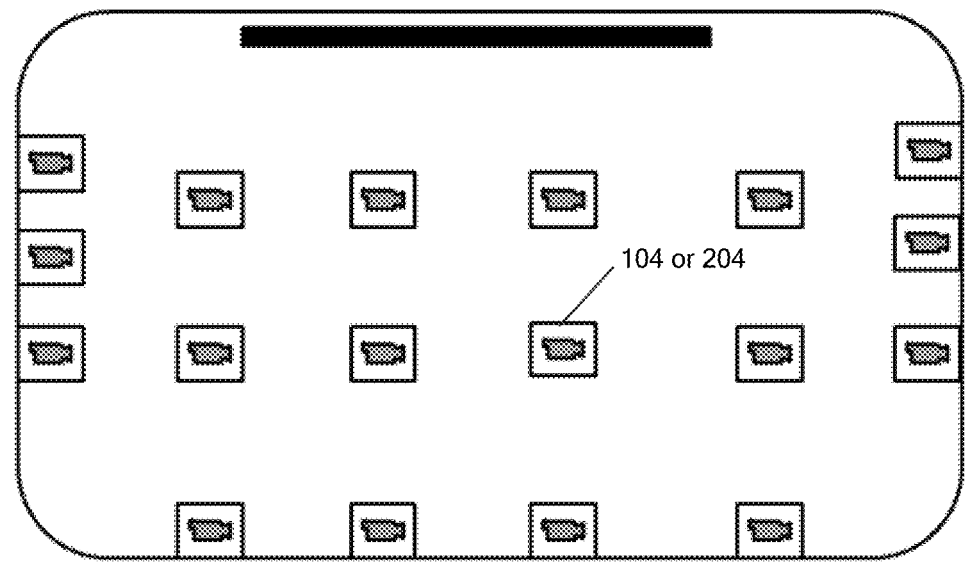
FIG. 3 is an arrangement of image sensors in an environment where the conference device according to the embodiment of the present disclosure is located.

As an example, refer to FIG. 3, which is an arrangement of image sensors in the environment where the conference device according to the embodiment of the present disclosure is located. In FIG. 3, rectangular-shaped blocks represent the image sensors 104 or the image sensors 204, and the number and position of the image sensors 104 or the image sensors 204 may be arranged according to the space size of the conference place in the environment where the conference device is located. Each image sensor 104 or image sensor 204 may be wirelessly charged and used to collect information such as portraits, actions, and articles of participants in the conference place.

Figure 4:
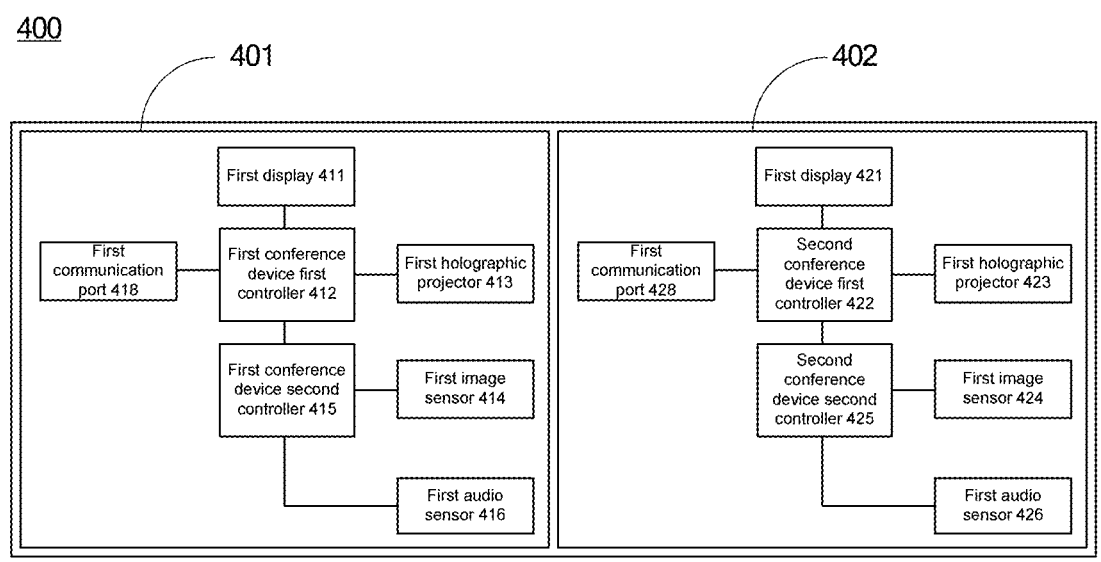
FIG. 4 is a schematic structural diagram of a conference system according to an embodiment of the present disclosure.

FIG. 4 is a schematic structural diagram of a conference system according to an embodiment of the present disclosure. As shown in FIG. 4, a conference system 400 comprises a first conference device 401 arranged in a first environment and a second conference device 402 arranged in a second environment.

The first environment and the second environment are different environments. For example, the first environment and the second environment may be located in different cities, e.g., the first environment is located in city A, and the second environment is located in city B. Alternatively, the first environment and the second environment may be located in different sites in the same city, e.g., when the conference system is applied to a teaching environment, the first environment may be classroom A, and the second environment may be classroom B. Alternatively, the first environment may be conference room A, and the second environment may be conference room B.

The first conference device 401 may be the conference device 100 shown in FIG. 1B or the conference device 200 shown in FIG. 2, or it may be another type of conference device. For example, the first conference device 401 may comprise a first display 411, a first conference device first controller 412, a first holographic projector 413, a first image sensor 414, a first conference device second controller 415 and a first audio sensor 416.

In the embodiment of the present disclosure, after the plurality of first image sensors 414 acquire images of the first environment, the first holographic projector 413 may generate first holographic projection data according to the images of the first environment based on the holographic projection technology, thus the two-dimensional image may be converted into multi-dimensional holographic projection data.

In the embodiment of the present disclosure, the first conference device 401 may further comprise a first communication port 418, which may be connected to the first conference device first controller 412. The first conference device 401 transmits the two-dimensional image displayed on the display via the first communication port 418.

In the embodiment of the present application, the user input data and the two-dimensional image displayed on the display may be transmitted to the outside through the first communication port 418. The first communication port 418 may use a wired network, a wireless network (such as Wireless Fidelity (WiFi), Bluetooth, etc.), or a mobile network (such as 2G, 3G, 4G, 5G, etc.), which is not limited in the present disclosure.

The second conference device 402 may be the conference device 100 shown in FIG. 1B or the conference device 200 shown in FIG. 2, or it may be another type of conference device. The second conference device 402 may be the same as or different from the first conference device 401. For example, the second conference device 402 may comprise a second display 421, a second conference device first controller 422, a second holographic projector 423, a second image sensor 424, a second conference device second controller 425, and a second audio sensor 426.

In the embodiment of the present disclosure, the second conference device 402 may further comprise a second communication port 428, which may be connected to the second conference device first controller 422. The second conference device 402 receives the two-dimensional image displayed on the display of the first conference device 401 via the second communication port 428.

In the embodiment of the present disclosure, the first communication port 418 and the second communication port 428 may communicate through a wired network, a wireless network, or a mobile network.

After receiving the data of the two-dimensional image from the first conference device 401, the second conference device 402 may display the received two-dimensional image by using the second display 411. Thus, in the second environment, the second conference device 402 may display the user input data and the two-dimensional image displayed on the display synchronously with the first conference device 401, thereby ensuring the synchronization and consistency of the information display, and improving the quality and efficiency of meeting and teaching.

In the embodiment of the present disclosure, through the communication between the first conference device 401 and the second conference device 402, the two-dimensional image displayed in the first environment is displayed synchronously in the second environment, thereby improving the participation of the participants in the second environment and the timeliness of interaction.

As an application scenario, when the user hosts a conference in the first environment, the first environment may be the near end, and the second environment may be the far end. According to the embodiment of the present disclosure, the two-dimensional image displayed in the first conference device at the near end may be transmitted to the second conference device at the far end for holographic display. In this way, it is possible to achieve a leap from traditional two-dimensional display to multi-dimensional imaging, which improves the quality and efficiency of meeting and teaching, and improves the participation of remote participants and the timeliness of interaction.

According to the embodiment of the present disclosure, in the process of the conference, all participants in the first environment may speak, and the first conference device may adjust the holographic projection content according to the location of the speaker, thereby accurately locating the holographic projection content according to the actual needs of participants in the first environment, so as to meet the personalized needs of different users.

According to the embodiment, the first conference device 401 may use the first audio sensor to collect the speech information of the speaker and obtain the location of the speaker.

For example, the first audio sensor may comprise a microphone array, through which the speech information of the speaker is collected. After the first audio sensor acquires the speech information of the speaker, the location of the speaker may be obtained. For example, the first audio sensor may identify the speech information and determine the location of the speaker based on a positioning algorithm for the location of the sound source, such as a positioning algorithm for the location of the sound source in the coordinate-transformed N-dimensional space.

In the embodiment of the present disclosure, after the first audio sensor collects the speech information of the speaker and obtains the location of the speaker, the first holographic projector may determine the target location of the holographic projection according to the location of the speaker. For example, when it is determined that the speaker is located at the middle of the conference place according to the location of the speaker, the middle of the conference place is determined as the target location of the holographic projection. Thus, according to the actual needs of the speaker in the first environment, the holographic projection data may be accurately located to the corresponding speaker, so that the user may more easily modify the holographic projection image, thereby meeting the personalized needs of different users and improving the interactive experience.

The second conference device 402 may receive the speech information of the speaker in the first environment through communication with the first conference device 401, and the second conference device 402 may play the speech information of the speaker in the first environment by using the second audio sensor 426.

According to the embodiment, the second conference device 402 located in the second environment may also modify the received two-dimensional image, and transmit the modification back to the first conference device 401 in the first environment.

For example, when the second conference device 402 displays the received two-dimensional image by using the second display 421, the two-dimensional image displayed on the second display 421 may be converted into holographic projection data through the second conference device first controller 422, and the second holographic projector 423 generates a holographic image based on the holographic projection data, and projects the holographic image to the target location.

Next, participants in the second environment may modify the holographic image. For example, the second conference device second controller 425 acquires, through the image data and voice data in the second environment collected by the second image sensor 424 and the second audio sensor 425, the modification made by the participants in the second environment for the holographic image, and the second conference device first controller 422 converts the modified holographic projection data into two-dimensional imaging data. The two-dimensional imaging data may be directly displayed on the second display 421 of the second conference device 402, or may be sent by the second conference device 402 to the first conference device 401 via the second communication port 428. In this way, the conference system according to the embodiment of the present disclosure may display synchronously in the first environment the modification made by the participants in the second environment for the content.

In the embodiment of the present disclosure, the two-dimensional image of the second environment may be converted into multi-dimensional holographic projection data based on the holographic projection technology, so as to improve the participation of the participants in the first environment and the timeliness of interaction.

In the embodiment of the present disclosure, the first conference device 401 may send the user input data and the two-dimensional image displayed on the first display 411 to the second conference device 402 for synchronous display. Similarly, the second conference device 402 may also send the user input data and the two-dimensional image displayed on the second display 421 to the first conference device 401 for synchronous display. In this way, the real-time interconnection of information of the first conference device 401 and the second conference device 402 may be realized, which improves the participation of participants and the timeliness of interaction.

According to the embodiment, the first conference device 401 may modify the holographic projection content according to an action of the participant in the first environment, such as raising hands, waving hands, lifting hands, etc., and locate the holographic projection content to the corresponding participant, thereby accurately locating the holographic projection content according to the actual needs of participants.

The second controller 415 of the first conference device 401 may identify the action of the speaker, and determine, according to the identified action, the modification made by the speaker for the holographic projection image.

In the embodiment of the present disclosure, after the first audio sensor 416 acquires the location of the speaker, at least one first image sensor collecting the speaker image among the plurality of first image sensors 414 may be determined according to the location of the speaker. The image collected by the at least one first image sensor is identified. For example, the action of the speaker, such as raising hands, waving hands, raising hands, and so on, may be determined. Next, the first conference device second controller 415 may determine, according to the identified action, the modification made by the speaker for the holographic projection image. According to the actual needs of the speaker in the first environment, the holographic projection image may be accurately located to the corresponding speaker, and the holographic projection image may be modified based on the action of the speaker, so as to meet the personalized needs of different users.

For example, when user A in the first environment is speaking, the holographic projection image may be located to user A and displayed near user A. For example, it is displayed within a range of a set distance centered on user A, and displayed in front of user A facing the first display. Furthermore, it may be displayed on the left-hand or right-hand side in front of user A, so as to collect the actions performed by user A to modify the holographic image. Suppose user A raises a question, user B is raising his hand, and user B intends to modify the holographic projection image, then the holographic projection image may be located near user B, so as to collect actions made by user B to modify the holographic image. In this way, the holographic projection data may be accurately located to the corresponding speaker to meet the personalized needs of different users.

According to the embodiment, the editing and modification performed by the participants in the first environment for the holographic image may comprise, for example, rotation, movement, magnification, inversion and stretching for the first holographic image, so as to meet the actual control requirements of the participants.

It should be noted that, in the above-mentioned embodiment, the conference system 400 according to the embodiment of the present disclosure has been described only in the case where the first conference device 401 and the second conference device 402 have the same structure. In fact, the first conference device 401 and the second conference device 402 may be exactly the same to achieve the same function. According to an embodiment, the first conference device 401 and the second conference device 402 may not be completely identical to achieve substantially the same function, thereby meeting the actual needs of the participants in the first environment and the second environment.

Figure 5:
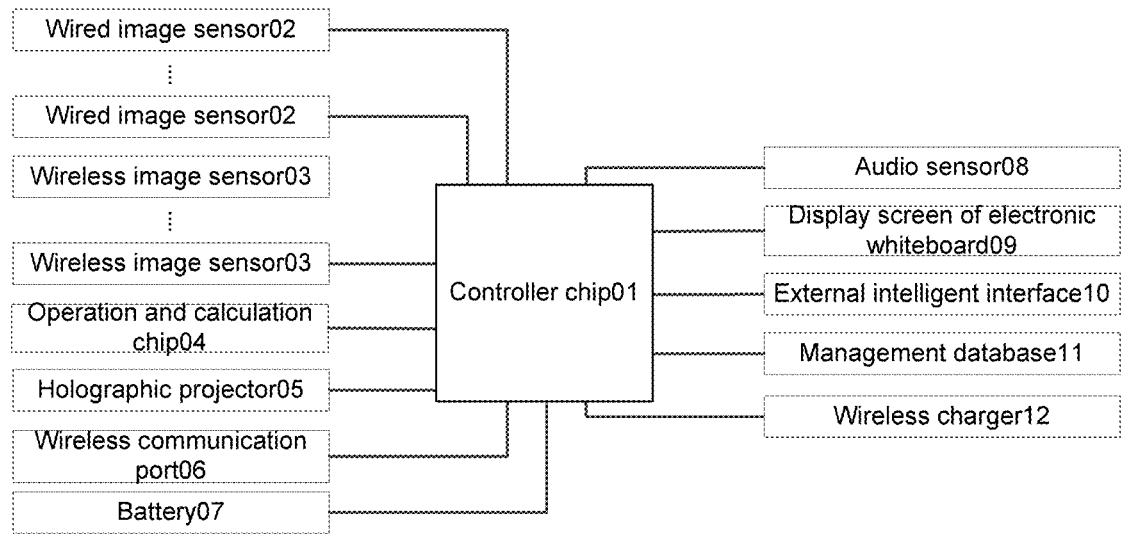
FIG. 5 is a schematic structural diagram of a conference device according to another embodiment of the present disclosure.

FIG. 5 is a schematic structural diagram of a conference device according to another embodiment of the present disclosure. As shown in FIG. 5, the first conference device or the second conference device may comprise the following.

A controller chip 01 in charge of the overall operation and calculation of the first conference device or the second conference device is configured to process the requirements and data of each composition structure in the first conference device or the second conference device.

A plurality of wired image sensors 02 are arranged around a display screen 09 of the electronic whiteboard to collect two-dimensional images displayed on the display screen 09 of the electronic whiteboard, and portraits, scenes, objects, and other information near the display screen 09 of the electronic whiteboard. The wired image sensors 02 may rotate 360° and recognize the gestures of participants (mainly the presenter near the display screen 09 of the electronic whiteboard) in the visible range, such as raising hands, waving hands, lifting hands, voice and other instructions. The controller chip 01 may adjust the corresponding shooting angle of the wired image sensors 02 according to the recognition result. The content collected by the plurality of wired image sensors 02 may be used and processed by an operation and calculation chip 04.

A plurality of wireless image sensors 03 are arranged at a plurality of acquisition points in the environment where the conference device is located. The wireless image sensors 03 may rotate 360° and are distributed in the space of conference room or classroom. It may be charged wirelessly and may transmit data wirelessly. The wireless image sensors 03 are used to collect images, movements, shapes, expressions, status, and other information data of all participants in the conference room or classroom, e.g., when participants enter the room, ask questions, and perform modification operations on the holographic image. The information collected by the wireless image sensors 03 may be used and processed by the operation and calculation chip 04.

The operation and calculation chip 04 is used for calculating and identifying based on the contents collected by the plurality of wired image sensors 02 and the plurality of wireless image sensors 03, and adjusting the holographic projection image according to the identified human action, so as to determine the modified holographic projection image. The operation and calculation chip 04 transmits the adjusted holographic projection data to the controller chip 01.

A holographic projector 05 may perform accurate imaging at the target location according to the instructions of the operation and calculation chip 04 and the controller chip 01, and the imaging range may be defined according to the operation parameters of the operation and calculation chip 04. After the imaging, participants may perform operations on the holographic projection image, such as rotation, movement, magnification, inversion, stretching, and so on. The operations performed on the holographic projection image may be collected through the plurality of wired image sensors 02 and the plurality of wireless image sensors 03.

A wireless communication port 06, including WiFi, Bluetooth, 4G, 5G and other types of mobile communication methods, may guarantee that under special circumstances, for example, in case of abnormal power failure or WiFi disconnection, mobile data signals may be used for communication.

A battery 07 is used for work and operation after power failure. It may safely, reliably and stably provide power to the first conference device or the second conference device under power failure, and maintain normal meeting, teaching and other operation processes.

An audio sensor 08 is used to collect and play audio information, and also to identify and determine the sound source of the speaker and the location of the speaker, for the operation and calculation chip 04 to retrieve data. It may realize remote audio interconnection.

The display screen 09 of the electronic whiteboard is used to display two-dimensional images. The display screen 09 may include a visual display and a touch operation circuit, or may include a multi-screen display. The display technology of the display screen 09 includes but is not limited to LCD, LED, OLED technologies. The touch technology includes but is not limited to capacitive, electromagnetic, infrared and other touch technologies, so as to achieve simultaneous, efficient, high-sensitive and multi-dimensional touch. The touch technology may be compatible with electromagnetic and capacitance operation at the same time, which may effectively avoid the situation that touch operation may not be performed if one touch function fails, and which may provide standby and alternative emergency solutions for the touch technology. In addition, electromagnetic touch technology may use active or passive electromagnetic pens for barrier-free touch operation when there are water stains and other substances on the display screen.

An external intelligent interface 10, such as HDMI, TF expansion port, USB2.0 or 3.0, LAN interface, RS232 and so on, may meet the requirements of external devices and other display transmission devices.

A management database 11 cooperates with the plurality of wired image sensors 02, the plurality of wireless image sensors 03, the holographic projector 05 and the wireless communication port 06 to identify the authority ID of the participants, manage the final data storage and upload after the conference, and process the temporary data.

A wireless charger 12 is used for charging the plurality of wireless image sensors 03, so that the plurality of wireless image sensors 03 are not limited by a limited range, and their installation positions may be adaptively adjusted according to the space size of the conference place.

Specifically, the operation and calculation chip 04 in FIG. 5 may calculate the actions, audios, input operations on the electronic whiteboard and modification operations on the holographic image from all participants, so that the operations and audios may be synchronously displayed on the display screen of the electronic whiteboard without delay, and simultaneously transmitted to the electronic whiteboard in the other environment, thereby displaying the corresponding holographic projection image in the other environment. The participants at the other end may modify and edit the holographic projection image, convert the modified or edited holographic projection image into two-dimensional imaging data, and send it to the electronic whiteboard of the conference device at this end for synchronous projection display. In addition, the holographic projection image may be adjusted according to the actions (such as raising hands, waving hands), voice and other information parameters of the participants, and the projection location and size may be accurately calculated by the operation and calculation chip 04.

Figure 6:
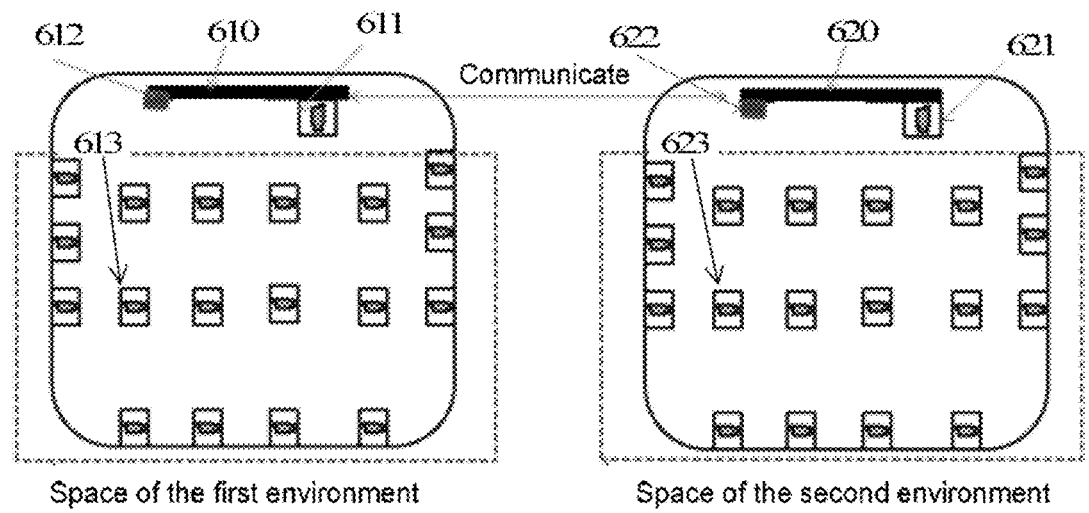
FIG. 6 is an arrangement of image sensors in an environment where the conference system according to the embodiment of the present disclosure is located.

FIG. 6 is an arrangement of image sensors in the environment where the conference system according to the embodiment of the present application is located. As shown in FIG. 6, in the first environment where the first conference device is located, a first electronic whiteboard 610 is provided; a wired image sensor 611 and a first holographic projector 612 are arranged near the first electronic whiteboard 610, for example, on the first electronic whiteboard 610 or within a preset range from the first electronic whiteboard 610; and the rectangular shaped blocks in the dotted frame represent the wireless image sensors 613. Similarly, in the second environment where the second conference device is located, a second electronic whiteboard 620 is provided; a wired image sensor 621 and a second holographic projector 622 are arranged near the second electronic whiteboard 620, for example, on the second electronic whiteboard 620 or within a preset range from the second electronic whiteboard 620; and the rectangular shaped blocks in the dotted frame represent the wireless image sensors 623. The first conference device and the second conference device may use wired network, wireless network and mobile network for communication.

Figure 7:
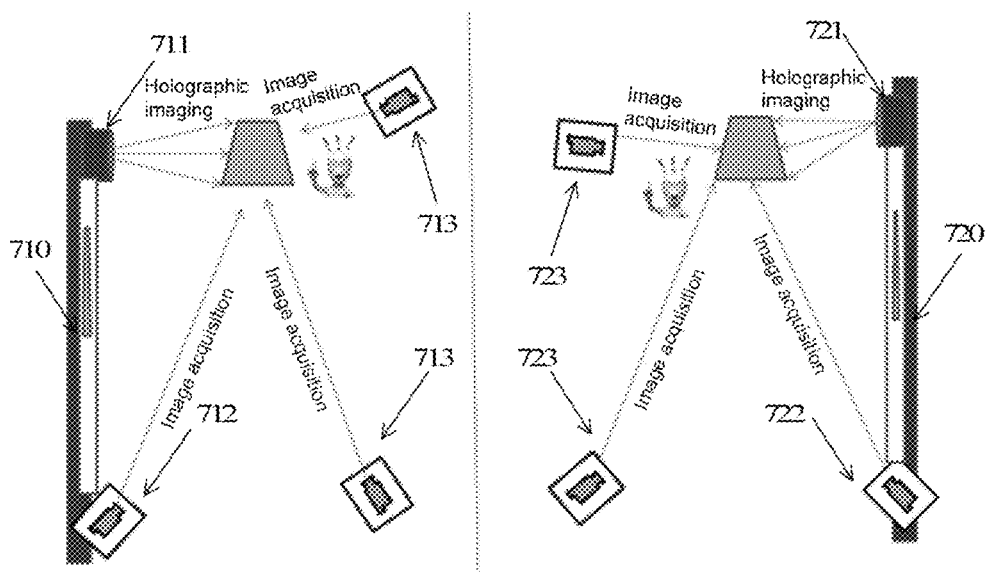
FIG. 7 is a schematic diagram of interaction of the conference devices in the conference system according to the embodiment of the present disclosure.

FIG. 7 is a schematic diagram of interaction of conference devices in the conference system according to the embodiment of the present disclosure. As shown in FIG. 7, in the first environment where the first conference device is located, the first conference device uses the first holographic projector 711 to project a holographic image at the target position based on the holographic projection data. If the participant in the first environment wants to modify the holographic image, the holographic image may be projected near the participant. Then, the participant modifies and annotates the holographic image. The modified holographic projection data may be converted into two-dimensional imaging data, and the modified holographic projection data may be displayed two-dimensionally and three-dimensionally in the first environment. The converted two-dimensional imaging data may also be sent to the second conference device in the second environment to perform two-dimensional display and three-dimensional display of the modified holographic projection data in the second environment. Similarly, the participant in the second environment may modify and annotate the holographic projection image. The modified holographic projection data may be converted into two-dimensional imaging data, and the modified holographic projection data may be displayed two-dimensionally and three-dimensionally in the second environment. The converted two-dimensional imaging data may also be sent to the first conference device in the first environment for two-dimensional display and three-dimensional display of the modified holographic projection data in the first environment. Similarly, as shown in FIG. 7, when the holographic image is modified in the second environment, the holographic image may be projected near the participant, and the participant may modify and annotate the holographic projection image.

In FIGS. 7, 712 and 722 are wired image sensors for collecting the two-dimensional images displayed on the electronic whiteboard 710 as well as actions, gestures, etc. of objects (such as the presenter) in the area around the electronic whiteboard 710. 713 and 723 are wireless image sensors, which are used to collect images in the environment where the conference device is located, so as to identify the modification made by participant for the holographic image.

According to the conference system of the embodiment of the present disclosure, the information of the first conference device and the second conference device may be interconnected in real time, and the participants in the first environment and the participants in the second environment may conveniently modify the holographic projection image in their respective environments.

According to the conference system of the embodiment of the present disclosure, when the first conference device or the second conference device is used alone, according to the actual needs of the participant, the holographic projection content may be modified, accurately located to the target location at the side of the person in need, and converted into a two-dimensional image for display. When the first conference device and the second conference device are used together, the first conference device side may display the modification made in the second environment for the holographic image, and the second conference device side may display the modification made in the first environment for the holographic image, thereby achieving information interconnection. In addition, it also achieves a leap from traditional two-dimensional display to multi-dimensional imaging, realizes presentation of remote scene in the current spatial range, and realizes the combination of remote virtuality and reality, thereby achieving non-distance communication of participants in different environments, and improving the quality and efficiency of meeting and teaching.

The embodiment of the present disclosure further provides a method of controlling a conference device, which may be used to control the conference device according to the above-mentioned embodiments.

Figure 8:
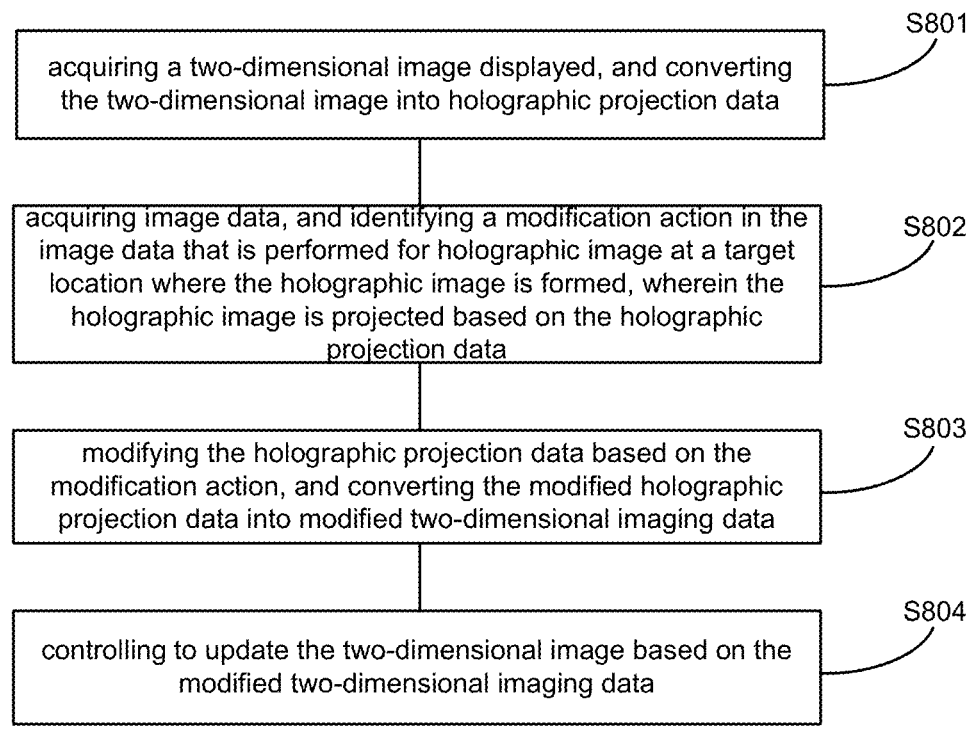
FIG. 8 is a schematic flowchart of a method of controlling a conference device according to an embodiment of the present disclosure.

FIG. 8 is a schematic flowchart of a method of controlling a conference device according to an embodiment of the present disclosure.

As shown in FIG. 8, the control method 800 according to the embodiment may comprise the following steps.

In step S801, acquiring a two-dimensional image displayed, and converting the two-dimensional image into holographic projection data.

In step S802, acquiring image data, and identifying a modification action in the image data that is performed for holographic image at a target location where the holographic image is formed, wherein the holographic image is projected based on the holographic projection data.

In step S803, modifying the holographic projection data based on the modification action, and converting the modified holographic projection data into modified two-dimensional imaging data.

In step S804, controlling to update the two-dimensional image based on the modified two-dimensional imaging data.

The method of controlling a conference device according to an embodiment will be described in detail with reference to FIG. 1B and FIG. 8.

First, the first controller converts the two-dimensional image displayed on the display into holographic projection data.

The conference device applied in the first environment is illustrated as an example. First, the conference device may display a two-dimensional image by using the display. The two-dimensional image may be, for example, the speech materials or documents prepared by the main presenter of the meeting, or the content input into the display by the presenter on site, which is not limited in the present disclosure. For example, the presenter may input data through an electronic whiteboard as a display. Specifically, the presenter may input the corresponding content on the electronic whiteboard according to his own needs. For example, the presenter may modify the display parameters of the first electronic whiteboard, and the presenter may also modify and annotate the content displayed on the electronic whiteboard. Accordingly, the electronic whiteboard may receive the input data of the presenter and display the received content.

Next, the conference device converts the displayed two-dimensional image into holographic projection data by using the first controller. For example, the first controller may calculate the corresponding holographic projection data based on the graphic information and parameters of the two-dimensional image collected by the image sensor. For another example, the first controller may also calculate the corresponding holographic projection data based on the graphic information and parameters of the two-dimensional image collected by the image sensor as well as the graphic information and parameters of the two-dimensional image input by the user. However, the present disclosure is not limited to this, and any method may be used to convert the two-dimensional image into holographic projection data.

Then, the holographic projector generates a holographic image according to the holographic projection data and projects the holographic image to the target location.

In the embodiment of the present disclosure, the conference device may generate a holographic image according to the holographic projection data based on the holographic projection technology. Thus, the two-dimensional image may be converted into multi-dimensional holographic projection image.

Then, the image sensors collect image data in the environment where the conference device is located.

The image sensor may be Charge Coupled Device (CCD), Complementary Metal Oxide Semiconductor (CMOS), Thin Film Transistor (TFT) or other image acquisition devices, which is not limited in the present disclosure.

Then, the second controller identifies, by using the image data, the modification action performed at the target position for the holographic image.

In the embodiment of the present disclosure, the second controller may identify the image collected by the image sensor. For example, the action of the speaker, such as raising hands, waving hands, lifting hands, etc., may be determined, so as to determine the modification action performed at the target location for the holographic image.

The editing and modification made by the participants for the holographic projection image may comprise, for example, rotation, movement, magnification, inversion and stretching for the holographic projection content, so as to meet the actual control needs of the participants.

Then, the second controller modifies the holographic projection data based on the modification action, and provides the modified holographic projection data to the first controller.

Then, the first controller converts the received modified holographic projection data into modified two-dimensional imaging data.

Then, the first controller controls the display to update the two-dimensional image according to the modified two-dimensional image data.

Therefore, according to the method of controlling a conference device above, the modification made by the participant for the holographic projection image may be easily expressed on the two-dimensional image displayed on the display.

In the embodiment of the present disclosure, participants may modify the two-dimensional image by modifying the holographic projection image, which is helpful to improve the quality and efficiency of meeting and teaching, and to improve the participation of participants and the timeliness of interaction.

In the process of the conference, all participants in the environment may speak. The conference device may adjust the target location of the holographic projection according to the location of the speaker, thereby accurately locating the holographic projection image according to the actual needs of participants in the first environment, so as to meet the personalized needs of different users.

According to the embodiment, the conference device may also determine the target location by using the audio sensor. Specifically, the audio sensor collects the voice data in the environment where the conference device is located, and the second controller determines, based on the voice data, the location of the sound source generating the voice data as the target location.

In the embodiment of the present disclosure, the conference device may collect the speech information of the speaker through the audio sensor and obtain the location of the speaker. For example, the audio sensor may comprise a microphone array, through which the speech information of the speaker is collected. After the audio sensor acquires the speech information of the speaker, the location of the speaker may be obtained. For example, the audio sensor may identify the speech information and determine the location of the speaker based on a positioning algorithm for the location of the sound source, such as a positioning algorithm for the location of the sound source in the coordinate-transformed N-dimensional space.

According to the embodiment, the conference device may also determine, based on the data collected by the image sensor and the audio sensor, the modification action performed at the target position for the holographic image.

According to the embodiment, the first controller of the conference device may send the two-dimensional image displayed on the display to the conference device in the other environment via the communication port, so as to display the two-dimensional image in the other environment.

According to the embodiment, the first controller of the conference device may receive the two-dimensional image from the conference device in the other environment via the communication port. The two-dimensional image from the conference device in the other environment may include the modification made in the other environment for the holographic image.

According to the embodiment, the second controller of the conference device may receive, from the management database, information about objects in the environment where the conference device is located, such as the identity, unit, title, field, etc. of the participants. The second controller may associate the information of the objects with the identified modification action performed at the target location for the holographic image, and provide the associated object information and the modified holographic projection data to the first controller. Then, the first controller may control the display to display the corresponding object information when displaying the two-dimensional image.

For example, participant A makes a movement modification for the holographic projection image, the second controller identifies the movement modification and associates the participant A with the movement modification. When the movement modification is displayed in the form of a two-dimensional image on the display, the first controller may control the display to synchronously display the relevant information of participant A, thereby further achieving the no-distance communication of participants, and improving the quality and efficiency of meeting and teaching.

In the description of the specification, the description with reference to the terms "an embodiment", "some embodiments", "examples", "specific examples", or "some examples" means that the specific features, structures, materials or characteristics described in combination with the embodiment or example are included in at least one embodiment or example of the present disclosure. In the specification, the schematic expression of the above terms does not have to be directed to the same embodiment or example. Moreover, the specific features, structures, materials or characteristics described may be combined in an appropriate manner in any one or more embodiments or examples. In addition, without contradicting each other, those skilled in the art may combine different embodiments or examples described in the specification and features of different embodiments or examples.

In addition, the terms "first" and "second" are used for descriptive purposes only and may not be understood as indicating or implying relative importance or implying the number of indicated technical features. Thus, the features defined as "first" and "second" may include at least one of the features explicitly or implicitly. In the description of the present disclosure, "a plurality of" means at least two, such as two, three, etc., unless otherwise specified.

Any process or method description in the flowchart or described in other ways herein may be understood as indicating a module, fragment or part of the code including one or more executable instructions for realizing the steps of the customized logic function or process, and the scope of the preferred embodiment of the present application includes additional implementations, in which the functions may be performed not in the order shown or discussed, including performing the functions in a substantially simultaneous manner or in reverse order according to the functions involved. It shall be understood by those skilled in the art to which the embodiments of the present application belong.

Logic and/or steps represented in a flowchart or otherwise described herein, for example, may be considered as an ordered list of executable instructions for implementing logical functions, and may be specifically implemented in any computer-readable medium for instruction execution systems, devices, or apparatuses (such as computer-based systems, systems including processors, or other systems that may fetch and execute instructions from instruction execution systems, devices, or apparatuses), or may be used in combination with these instruction execution systems, devices, or apparatuses. For the purpose of this specification, "computer-readable medium" may be any device that may contain, store, communicate, propagate or transmit programs for use by or in combination with an instruction execution system, device or apparatus. A more specific example (non-exhaustive list) of a computer-readable medium includes the following: an electrical connection section (electronic device) having one or more wiring, a portable computer disk case (magnetic device), a random access memory (RAM), a read only memory (ROM), an erasable programmable read only memory (EPROM or flash memory), an optical fiber device, and a compact disk read only memory (CDROM). In addition, the computer-readable medium may even be a paper or other suitable medium on which the program may be printed, because the program may be obtained electronically by, for example, optical scanning of the paper or other medium, followed by editing, interpretation or, if necessary, other suitable processing, and then stored in a computer memory.

It is to be understood that the various parts of the present application may be implemented with hardware, software, firmware or a combination thereof. In the above embodiments, a plurality of steps or methods may be implemented with software or firmware stored in memory and executed by a suitable instruction execution system. For example, if it is realized by hardware as in another embodiment, it may be realized by any one of the following technologies known in the art or their combination: discrete logic circuit with logic gate circuit for realizing logic function of data signal, special integrated circuit with suitable combination logic gate circuit, programmable gate array (PGA), field programmable gate array (FPGA), etc.

Those ordinary skilled in the art may understand that all or part of the steps carried by the method of the above embodiment may be completed by instructing related hardware through a program. The program may be stored in a computer-readable storage medium. When executed, it includes one of the steps of the method embodiment or a combination thereof.

In addition, each functional unit in each embodiment of the present application may be integrated together or implemented as a separate circuit. The above integrated functional units may be realized either in the form of hardware or in the form of software. If the integrated functional unit is realized in the form of software and sold or used as an independent product, it may also be stored in a computer readable storage medium.

The storage medium mentioned above may be read-only memory, disk or optical disc, etc. Although the embodiments of the present application have been shown and described above, it is understood that the above embodiments are exemplary and may not be understood as restrictions on the present application. Those skilled in the art may change, modify, replace and transform the above embodiments within the scope of the present application.

The invention claimed is:

1. A conference device, comprising: a display, configured to display a two-dimensional image; an image sensor, configured to collect image data in an environment where the conference device is located; a holographic projector, configured to generate a holographic image according to holographic projection data and project the holographic image to a target location; and a controller connected to the display, the image sensor and the holographic projector, configured to acquire the two-dimensional image displayed on the display, convert the two-dimensional image into the holographic projection data, acquire the image data provided by the image sensor, identify a modification action in the image data that is performed at the target location for the holographic image projected by the holographic projector to the target location, modify the holographic projection data based on the modification action, convert the modified holographic projection data into modified two-dimensional imaging data, so as to control the display to update the two-dimensional image based on the modified two-dimensional imaging data; and wherein the controller comprises a first controller and a second controller, wherein the first controller is connected to the display and the holographic projector, and is configured to acquire the two-dimensional image displayed on the display, convert the two-dimensional image into holographic projection data, acquire the modified holographic projection data, and convert the modified holographic projection data into modified two-dimensional imaging data, so as to control the display to update the two-dimensional image based on the modified two-dimensional imaging data; and wherein the second controller is connected to the image sensor and the first controller, and is configured to acquire the image data provided by the image sensor, identify the modification action in the image data that is performed at the target location for the holographic image projected by the holographic projector to the target location, and provide the modified holographic projection data to the first controller.

2. The conference device according to claim 1, further comprising:
   an audio sensor connected to the controller, configured to collect voice data in the environment where the conference device is located;
   wherein the controller is further configured to determine, based on the voice data, a location of a sound source generating the voice data as the target location.

3. The conference device according to claim 2, wherein the controller is further configured to identify, by using the voice data, a modification action performed at the target location for the holographic image, and modify the holographic projection data based on the modification action.

4. The conference device according to claim 1, wherein the image sensor comprises a plurality of image sensors each provided with a wireless interface and arranged at a plurality of locations in the environment where the conference device is located.

5. The conference device according to claim 4, wherein the plurality of image sensors each are further provided with a wired interface, arranged around the display, and configured to collect the two-dimensional image displayed on the display.

6. The conference device according to claim 1, further comprising:
   a memory for storing a management database, connected to the controller and configured to provide the controller with information about an object participating in a conference in the environment where the conference device is located, and
   wherein the controller is further configured to associate the information about the object with the identified modification action performed at the target location for the holographic image.

7. A method of controlling the conference device according to claim 1, comprising:

acquiring a two-dimensional image displayed, and converting the two-dimensional image into holographic projection data;

acquiring image data, and identifying a modification action in the image data that is performed for holographic image at a target location where the holographic image is formed, wherein the holographic image is projected based on the holographic projection data;

modifying the holographic projection data based on the modification action, and converting the modified holographic projection data into modified two-dimensional imaging data; and controlling to update the two-dimensional image based on the modified two-dimensional imaging data.

8. The method according to claim 7, further comprising:
determining, based on voice data acquired in the environment where the conference device is located, a location of a sound source generating the voice data as the target location.

9. The method according to claim 8, further comprising identifying, by using the voice data, the modification action performed for the holographic image at the target location.

10. The method according to claim 7, wherein the modification action performed for the holographic image at the target location comprises rotation, movement, magnification, inversion and stretching for the holographic image.

11. The method according to claim 7, further comprising:
transmitting the two-dimensional image to a conference device in another environment, so as to display the two-dimensional image in the another environment.

12. The method according to claim 7, further comprising:
receiving a two-dimensional image from a conference device in another environment, wherein the two-dimensional image from the conference device in the another environment comprises a modification action performed for the holographic image in the another environment.

13. The method according to claim 7, further comprising:
acquiring information about an object participating in a conference in the environment where the conference device is located; and
associating the information about the object with the identified modification action performed for the holographic image at the target location.

14. A non-transitory computer storage medium, having a computer program stored thereon that, when executed by a processor, performs the method according to claim 7.

* * * * *